US012355223B1

(12) United States Patent
Bucarano et al.

(10) Patent No.: US 12,355,223 B1
(45) Date of Patent: Jul. 8, 2025

(54) ONE-GANG RETROFIT ELECTRICAL BOX ASSEMBLY

(71) Applicants: Pedro Bucarano, Miami, FL (US); Regis Fernandez Gonzalez, Hialeah, FL (US)

(72) Inventors: Pedro Bucarano, Miami, FL (US); Regis Fernandez Gonzalez, Hialeah, FL (US)

( * ) Notice: Subject to any disclaimer, the term of this patent is extended or adjusted under 35 U.S.C. 154(b) by 0 days.

(21) Appl. No.: 19/071,317

(22) Filed: Mar. 5, 2025

(51) Int. Cl.
*H02G 3/08* (2006.01)

(52) U.S. Cl.
CPC .................................. *H02G 3/081* (2013.01)

(58) Field of Classification Search
CPC .......... H02G 3/081; H02G 3/10; H02G 3/086; H02G 3/12; H02G 3/14; H01R 13/60
USPC ..................................... 220/3.5, 242; 174/50
See application file for complete search history.

(56) References Cited

U.S. PATENT DOCUMENTS

| 6,364,673 | B1* | 4/2002 | Lee ..................... H01R 13/4532 |
| | | | 174/67 |
| 6,881,094 | B2* | 4/2005 | Magyar .................. H02G 3/121 |
| | | | 439/535 |
| 7,211,727 | B2* | 5/2007 | Pearse .................... H02G 3/121 |
| | | | 174/53 |

* cited by examiner

*Primary Examiner* — Stephen J Castellano
(74) *Attorney, Agent, or Firm* — Ruben Alcoba, Esq.

(57) ABSTRACT

A one-gang retrofit (old work) electrical box assembly device for low voltage applications is described which comprises a frame with a curvilinear closed thin-walled section configured to fit into a curvilinear wall opening, including an electrical device mounting interface used to secure a low voltage electrical devices, and featuring two types of a wall attachment means integrated by fastening and locking mechanisms to secure the frame to a wall and within the curvilinear wall opening; where none of the referred constituting components of the one-gang retrofit (old work) electrical box assembly device for low voltage applications protrudes beyond defined limits, making this design the only that do not collide with a vertical or horizontal studs behind the wall, near or just in a borders of the wall opening where it has to be installed, while maximizing internal dimensions, robustness, versatility and strength.

7 Claims, 7 Drawing Sheets

ONE-GANG RETROFIT ELECTRICAL BOX ASSEMBLY

FIELD OF THE INVENTION

One and multiple gang electrical box assemblies are pivotal components in organizing electrical elements within housing and building structures, including retrofit and renovation projects requiring electrical installations in pre-existing walls where retrofit (old work) electrical box assemblies play a fundamental role in these scenarios.

Despite advancements in prior art for retrofit (old work) electrical box assemblies, limitations persist, underscoring the need for advancements in this field of invention. The persisting limitations include:
1. Lack of viable solutions for retrofit (old work) electrical box assembly device to be installed where vertical or horizontal studs behind walls are near or just in the borders of the necessary wall opening for electrical boxes installations.
2. Absence of multiple fastening methods within the same retrofit (old work) electrical box assembly device to secure it to the wall within the wall opening, restricting installation flexibility and strength.
3. No concern in providing a retrofit (old work) electrical box assembly device designs with an integrated tool to minimize resources (time and tools) to create the necessary wall opening for an electrical box installation with a proper level and a fast and precise positioning height definition.

Furthermore, recent art in this field of invention exhibits the inability to evolve from previous innovations with a robust curvilinear design that require a different approach to achieve a new retrofit (old work) electrical box assembly device capable to avoid undesired box deformations and gaps between electrical boxes and wall openings or cover plates, while ensuring maximum box interior space as a critical benefit to accommodate electrical devices and necessary wiring.

By leveraging insights from previous innovations and introducing new design principles, the present invention aims to efficiency, flexibility, and adaptability in old work electrical box assembly applications through comprehensive solutions and addressing identified limitations, the invention endeavors to enhance the functionality, reliability, and ease of installation of electrical box assemblies in diverse settings.

BACKGROUND OF THE INVENTION

Design details are critical for installers seeking optimal results in electrical applications, particularly concerning retrofit (old work) electrical box assembly devices. Understanding these details is essential to identify and address deficiencies in previous art within this field of invention. Some of these key design elements include:
1. Position of fastening mechanisms: All previous art employs fastening mechanisms positioned within the box's geometry in a way that:
  a) make impossible the installation when vertical or horizontal studs behind walls are near or just in the border of the necessary wall opening where the electrical boxes have to be installed.
  b) consume significant interior space of the electrical box.
2. Type and quantity of fastening mechanisms: All previous art offer only one type of fastening mechanism working as a diagonally opposed pair, with the implicit lack of options for utilizing multiple fastening methods within the same embodiment to maximize installation flexibility and strength.
3. Efficiency of the installation: No design in previous art offers an embedded tool within an embodiment of the electrical box to accelerate the positioning and leveling process for the wall opening creation to minimize resources (time and tools) during the installation.

Because of the above mentioned limitations and deficiencies in previous art within this field, the present invention is focused on providing a new one-gang retrofit (old work) electrical box assembly device suitable for low voltage applications. By introducing new features and integrating forgotten and despised yet efficient existing ones, the invention aims to create a more efficient and versatile device, addressing long standing challenges faced by installers in electrical installations.

MAIN OBJECTIVES OF THE INVENTION

Based on the identified limitations and deficiencies in previous art within the field of old work electrical box assemblies, the main objectives of the present invention are:
1. Overcoming vulnerabilities in installation: Develop a one-gang retrofit (old work) electrical box assembly device for low voltage applications, where fastening mechanisms are positioned and sized in a manner that make possible the installation when vertical or horizontal studs behind walls are near or just in the border of the necessary wall opening where the electrical boxes has to be installed while providing a secure attachment.
2. Enhancing installation flexibility and strength: Provide multiple types and amount of fastening methods within the same embodiment to maximize installation flexibility and strength, providing installers with versatile solutions tailored to any installation scenarios.
3. Improving installation efficiency: Provide an alignment-positioning-leveling-marking tool embedded within the retrofit (old work) electrical box assembly device to accelerate the positioning and leveling process to create the necessary wall opening, minimizing resources (time and tools) during the installation.
4. Enhancing installation robustness, capacity and aesthetics: Utilize curvilinear geometrical shapes that naturally distribute external forces evenly across its surfaces and minimize stress concentration that leads to deformation or failure. The curvilinear geometrical shapes prevent undesired deformations and gaps between the box and walls, as well as avoiding the gap between cover plates and walls. On the other hand, curvilinear geometrical shapes help to maximize the interior space of the electrical box in compliance with dimensional regulatory constraints.

By achieving these objectives, the present invention aims to improve the field of old work electrical box assemblies for low voltage application regardless of materials used to produce them; providing installers with efficient, versatile, and aesthetically pleasing solutions that address longstanding challenges and limitations in previous art. It is worth noting that although the concept of present invention is focused on the one-gang retrofit (old work) electrical box assembly device for low voltage applications, this concept applies directly to multiple gang devices and high voltage applications.

DESCRIPTION

Figure 1:
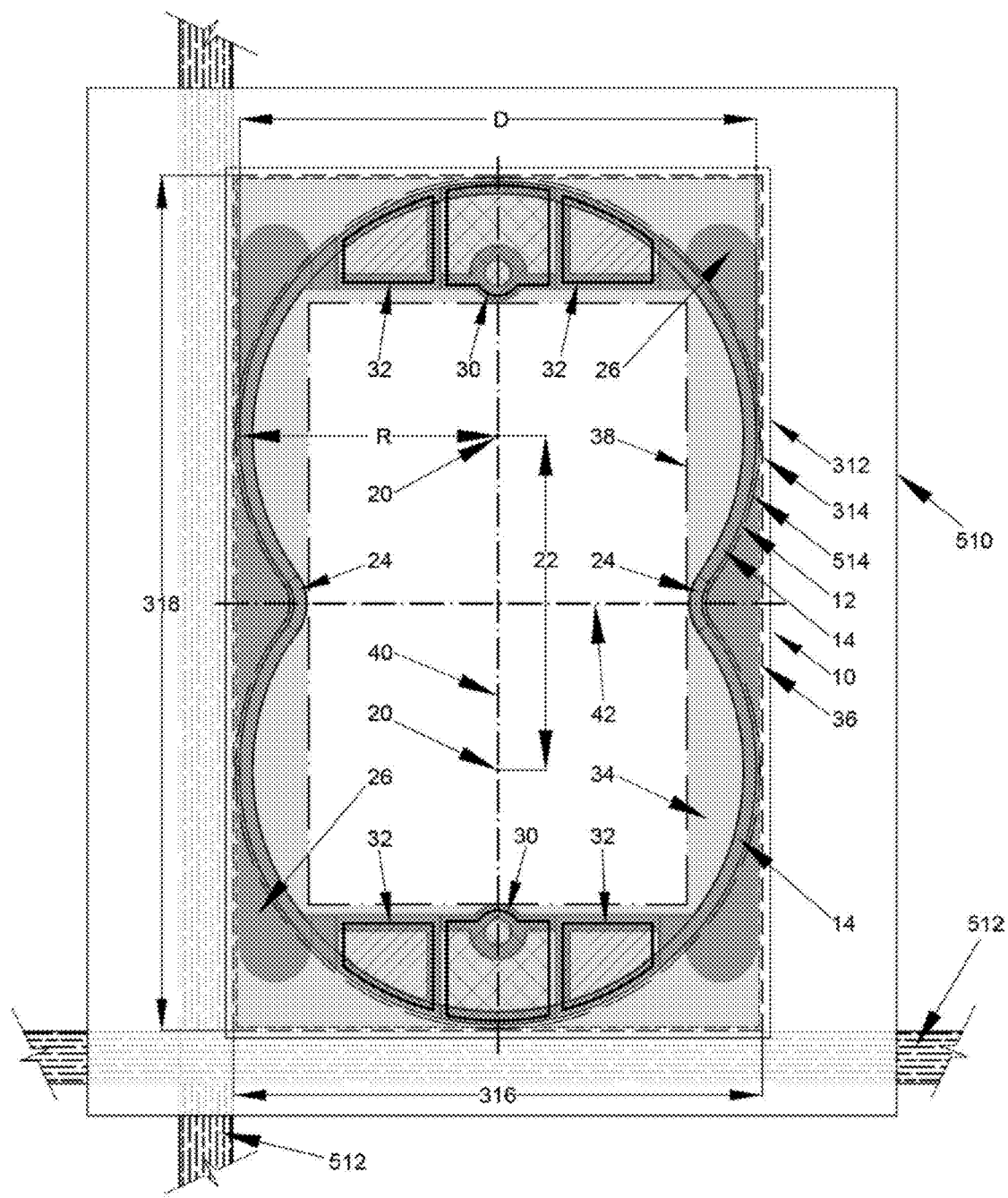
FIG. 1 shows a front view of a frame (10) of the one-gang retrofit (old work) electrical box assembly device for low voltage applications of the present invention, indicating its elements and limits.

FIG. 1 represents a front view of the frame (10) of a one-gang retrofit (old work) electrical box assembly device for low voltage applications of the present invention comprising a curvilinear closed thin-walled section element (12) integrated by a pair of large arc thin-walled segment sub-elements (14) with a radius dimension (R) and a diameter dimension (D), with a pair of centers (20) at a separation distance dimension (22), connected each other by a pair of small arc thin-walled segment sub-elements (24); the frame (10) also having a pair of front fixed jaws elements (26), and a pair of low voltage electrical device mounting interface sub-elements (30) highlighted by a two cross-hatchet lines regions, and a two pairs of the wall attachment features sub-elements (32) indicated by a parallel-hatchet lines regions. In this figure, the frame (10) is shown as inscribed inside an imaginary and referential rectangular ring shape envelope (34) highlighted by a shaded area to illustrate a dimensional frontiers imposed by this design to all its components, which is define by a pair of concentric rectangles represented with a dash-dot pattern lines, an external rectangle (36) and an internal rectangle (38) sharing a mayor symmetry line (40) and a minor symmetry line (42) which are also coincident with the symmetry lines of the frame (10).

Figure 2:
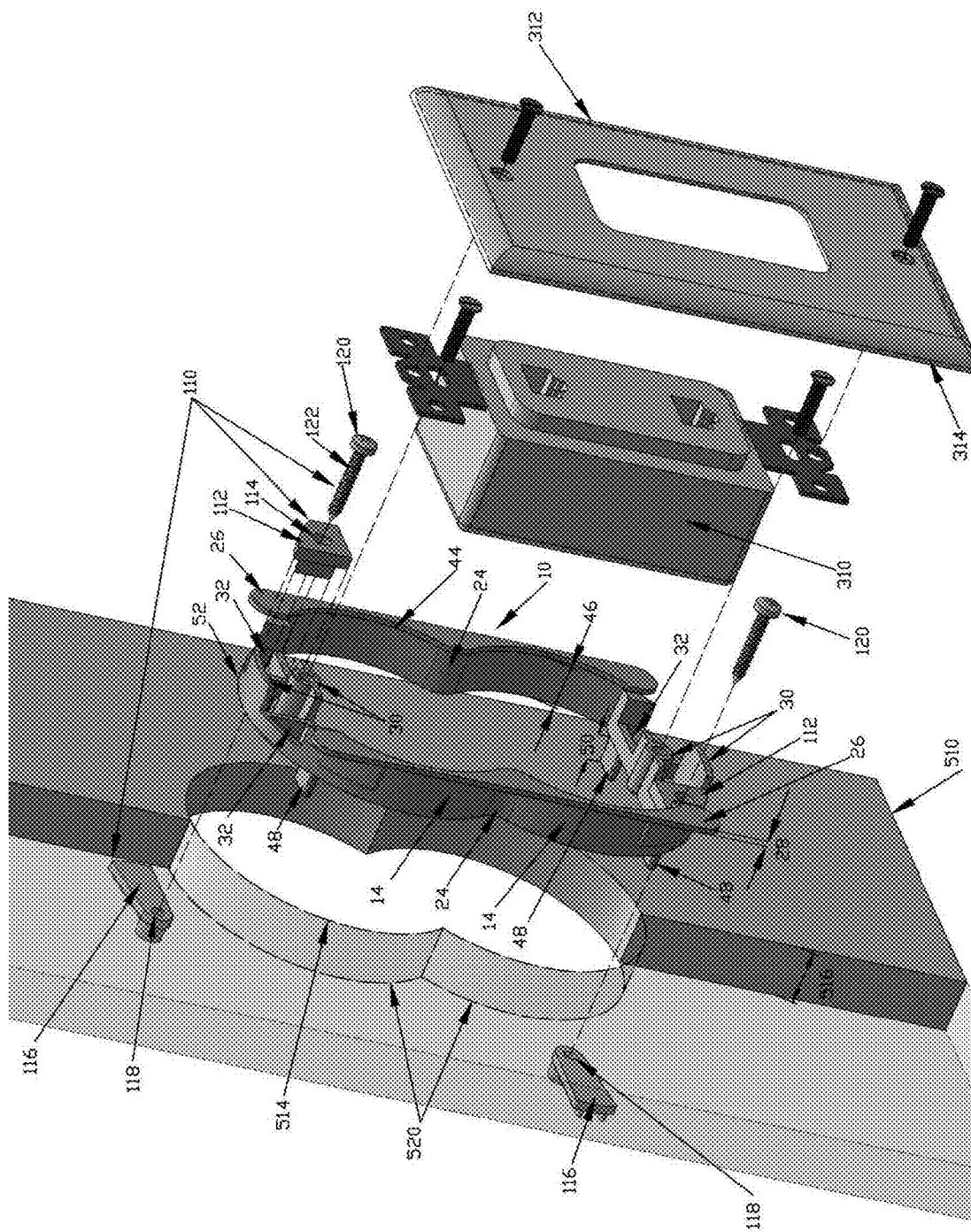
FIG. 2 shows an angled frontal view of a preferred embodiment of the one-gang retrofit (old work) electrical box assembly device for low voltage applications of the present invention, featuring a fastening and locking mechanism base on a screws (120).

FIG. 2 illustrates an angle view of the one-gang retrofit (old work) electrical box assembly device for low voltage applications of the present invention comprising the frame (10) and a first wall attachment means (110) used to secure the frame (10) to a wall (510) within the curvilinear wall opening (514) of a wall thickness dimension (516), the curvilinear closed thin-walled section element (12) with a maximum depth dimension (46) with the pair front fixed jaws elements (26) protruding from its from a front edge (44) a front fixed jaw thickness (28) and projecting perpendicular outward from an inner side of it, the pair of low voltage electrical device mounting interface sub-elements (30) intended to accommodate a low voltage electrical device (310), the smallest cover plate (312) of an interior edges (314), the two pairs of wall attachment features sub-elements (32) intended to accommodate the first wall attachment means (110), a two pairs of guide fins sub-elements (48) protruding from a back side plane (52) of the frame (10) a guide fin length (50).

The first wall attachment means (110) comprises a first insertable structural elements (112) that fit into the wall attachment features sub-elements (32) having a circular through-cavity (114), a movable circular-slotted jaws elements (116) with a circular slot (118), and the screws (120).

Figure 3:
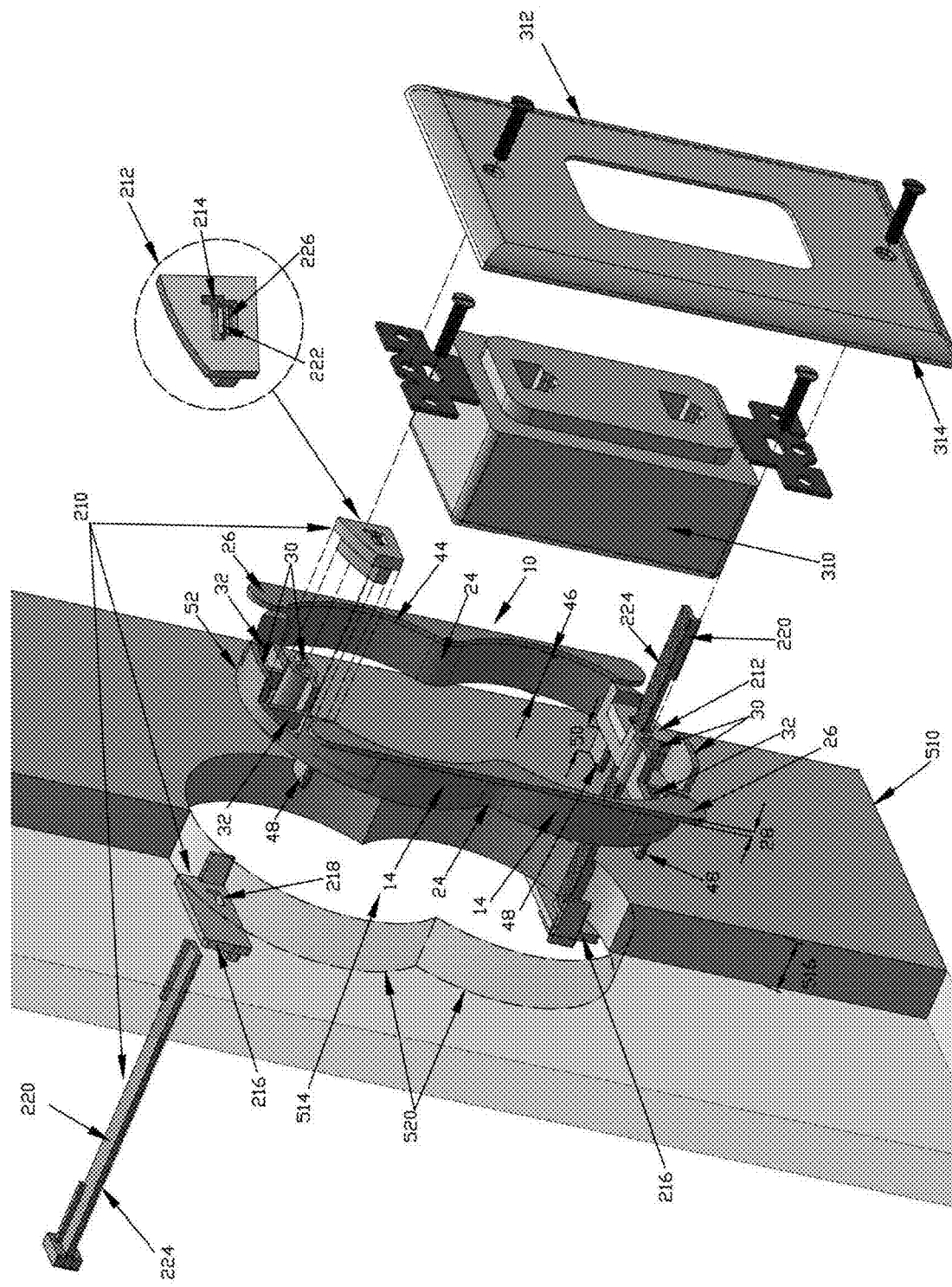
FIG. 3 shows an angled frontal view of another preferred embodiment of the one-gang retrofit (old work) electrical box assembly device for low voltage applications of the present invention featuring a fastening and locking mechanism base on a flexible L-shaped ratchet strap element (220).

FIG. 3 illustrates essentially the same angle view of the one-gang retrofit (old work) electrical box assembly device for low voltage applications of the present invention of FIG. 2 but comprising a second wall attachment means (210) that fits into the wall attachment features sub-elements (32) having a second insertable structural elements (212) with an L-shaped through-cavity (214) including a pawl-lock sub-element (222) with a decoupling channel (226); a movable L-shaped slotted jaws elements (216) featuring an L-shaped slot (218) and the flexible L-shaped ratchet strap element (220) including a series of a ratchet teeth sub-elements (224).

Figure 4:
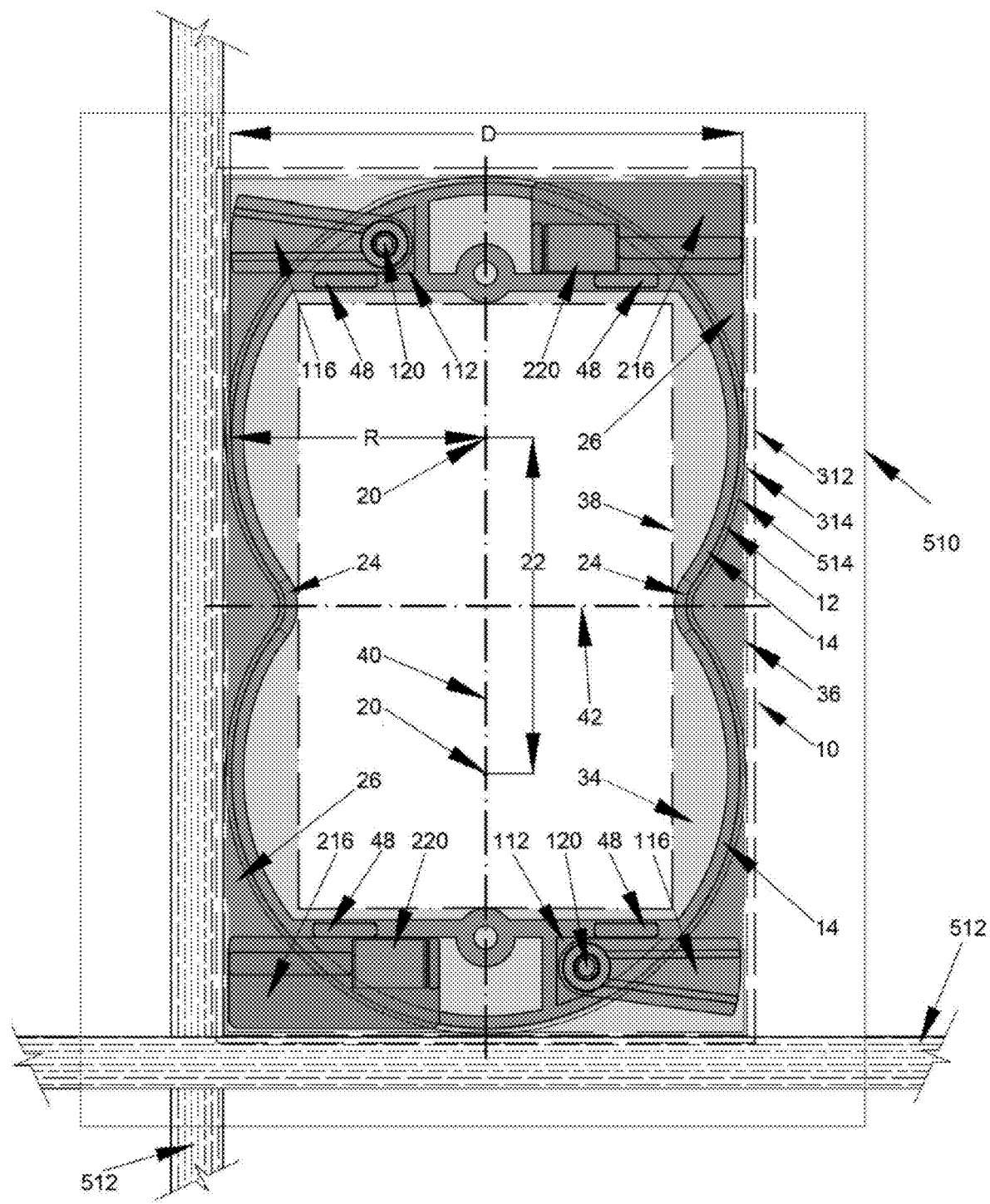
FIG. 4 shows a rear view of the one-gang retrofit (old work) electrical box assembly device for low voltage applications of the present invention featuring a combination of the fastening and locking mechanism presented in FIG. 2 and FIG. 3, indicating its elements and limits.

FIG. 4 represents a rear view of the of the frame (10) of the one-gang retrofit (old work) electrical box assembly device for low voltage applications of the present invention inserted within the curvilinear wall opening (514) and showing the first insertable structural elements (112), the movable circular-slotted jaws elements (116) and the screws (120); also showing the movable L-shaped slotted jaws elements (216) and the flexible L-shaped ratchet strap element (220). Other elements, dimensions and structural references already mentioned in FIG. 1 are shown in this figure as complimentary information.

Figure 5:
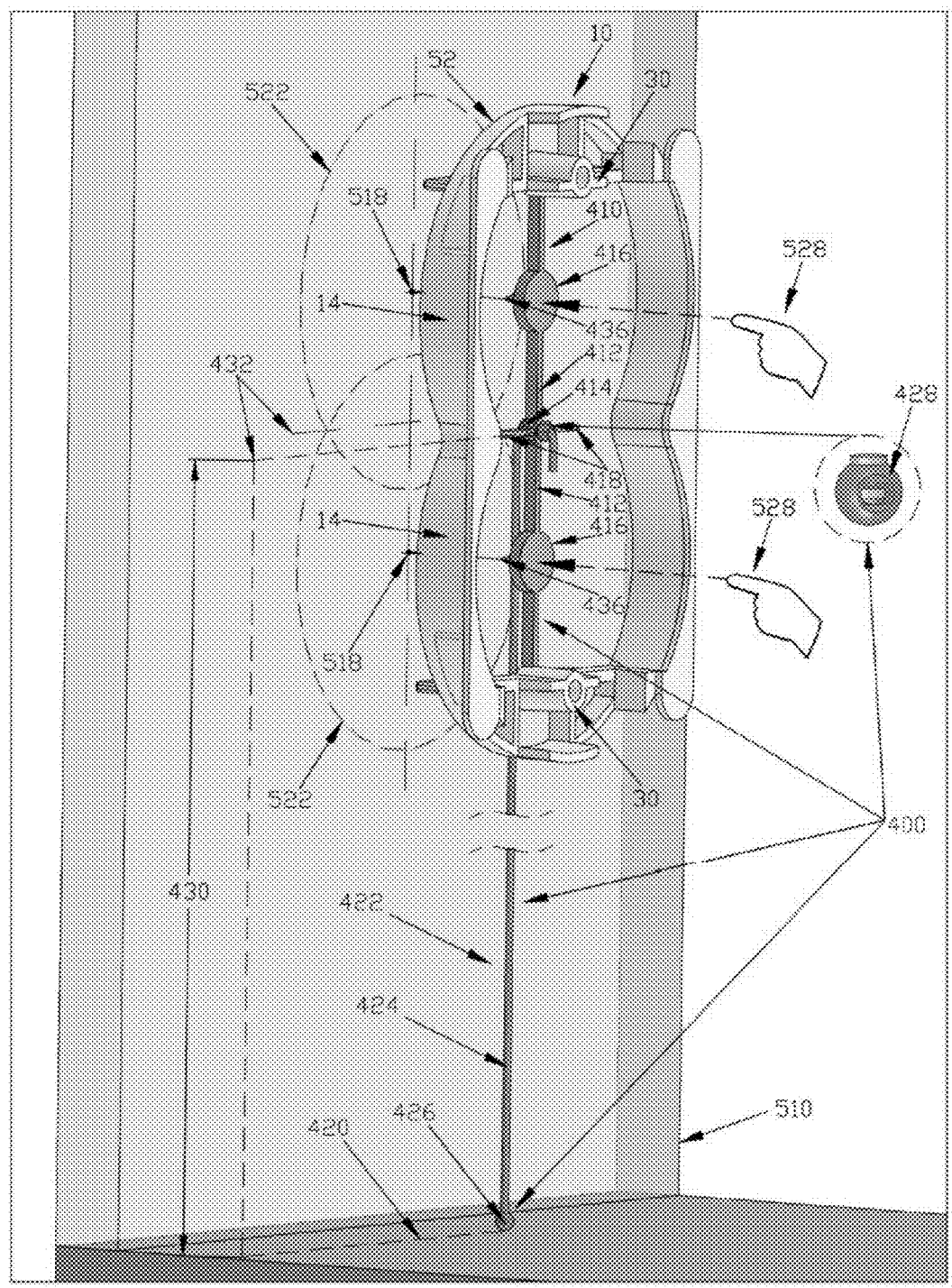
FIG. 5 shows an angled frontal view of the frame (10) of the one-gang retrofit (old work) electrical box assembly device for low voltage applications of the present invention featuring the alignment-positioning-leveling-marking tool (400) and leveled in a vertical direction, ready to create a pair of wall marks (518); parts, elements, dimensions and actions are indicated.

FIG. 5 depicts an angle frontal view of the frame (10) of the one-gang retrofit (old work) electrical box assembly device for low voltage applications of the present invention leveled at a positioning height (432) in vertical direction, featuring the alignment-positioning-leveling-marking tool (400) which comprises a ring centered cross-shaped alignment structure (410) as its first mayor part, developing between the pair of the low voltage electrical device mounting interface elements (30), having a pair of long arms elements (412) that converge to a central ring element (414) while including a pair of marking aid sub-elements (416) concentric with the pair of centers (20) of the pair of large arc thin-walled segment sub-elements (14); and a pair of short arms elements (418) that converge to the central ring element (414) at 90 degrees respect to the pair of long arms elements (412). The alignment-positioning-leveling-marking tool (400) also integrated by an adjustable plumb body (422), as its second part, comprising an adjustable cord element (424) displacing freely through the central ring element (414), having a fixed weight element (426) attached at one of its ends beyond the back side plane (52) of the frame (10) and a movable cord locker element (428) gripping the adjustable cord element (424) at the front side of the central ring element (414). A displacement length dimension (430) of the adjustable cord element (424) is indicated and is associated with the positioning height (432). The adjustable cord element (424) is completed stretched and freely hanging with near-zero clearance above a reference level (420) while the movable cord locker element (428) is stopped by the central ring element (414).

Figure 6:
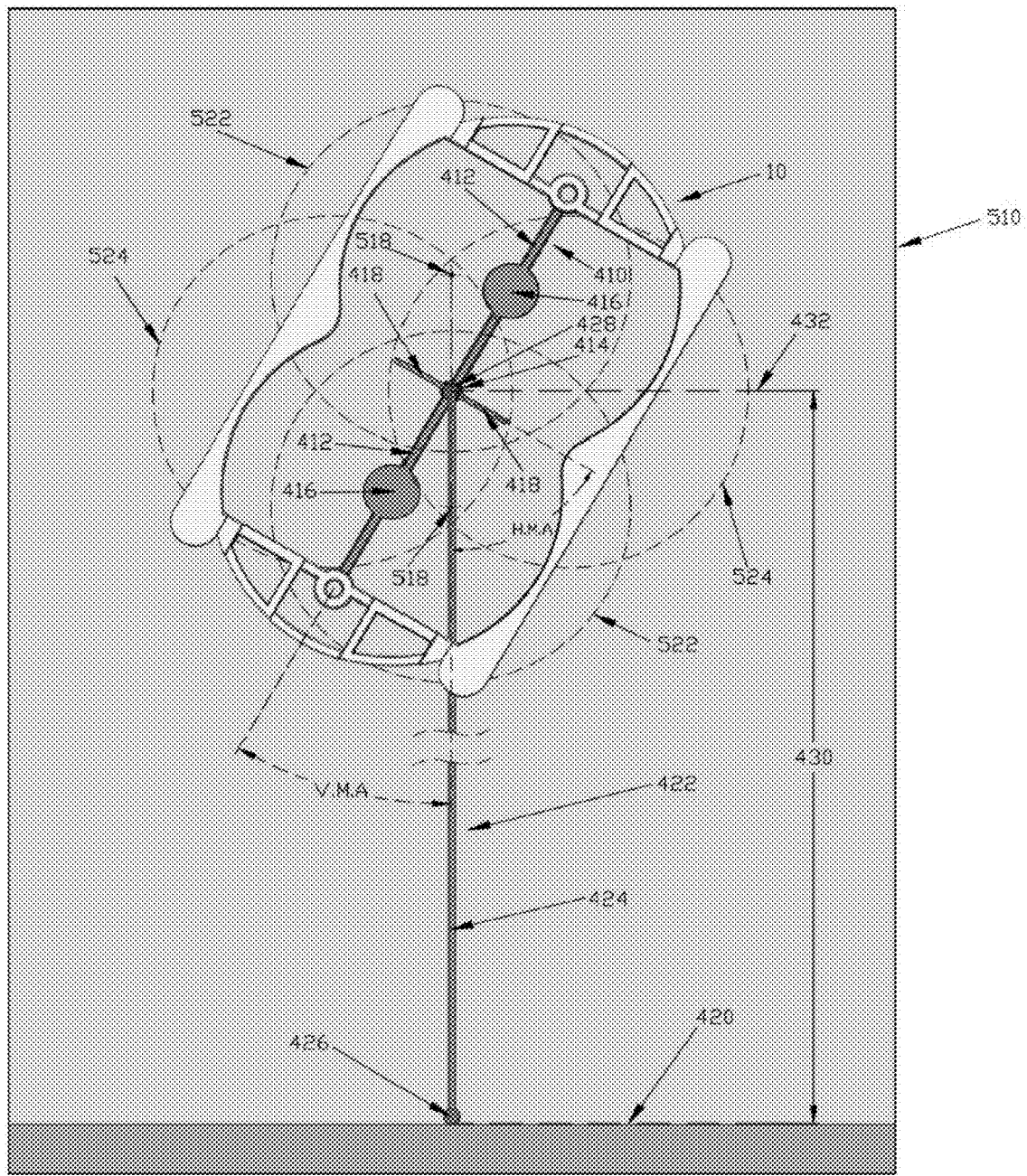
FIG. 6 shows a front view of the frame (10) of the one-gang retrofit (old work) electrical box assembly device for low voltage applications of the present invention featuring the alignment-positioning-leveling-marking tool (400), without being orientated in either the vertical or a horizontal direction; parts, elements, dimensions and misalignment angles are indicated.

FIG. 6 illustrates a front view of the frame (10) of the one-gang retrofit (old work) electrical box assembly device for low voltage applications of the present invention having the alignment-positioning-leveling-marking tool (400) integrated to it. The frame (10) is considered with its back side plane (52) near and parallel to the wall (510), located at the positioning height (432); the adjustable cord element (424) is completely stretched, the fixed weight element (426) is freely hanging with near-zero clearance above the reference level (420) while the movable cord locker element (428) is stopped by the central ring element (414), the frame (10) is showing a misalignment with a vertical orientated projected boundaries (522) and with a horizontal orientated projected boundaries (524) of a two possible pairs of intersecting circular wall holes (520) that can conform the curvilinear wall opening (514). The misalignment for vertical direction is indicated by a vertical misalignment angle (V.M.A) and the misalignment for horizontal direction is indicated by a horizontal misalignment angle (H.M.A).

Figure 7:
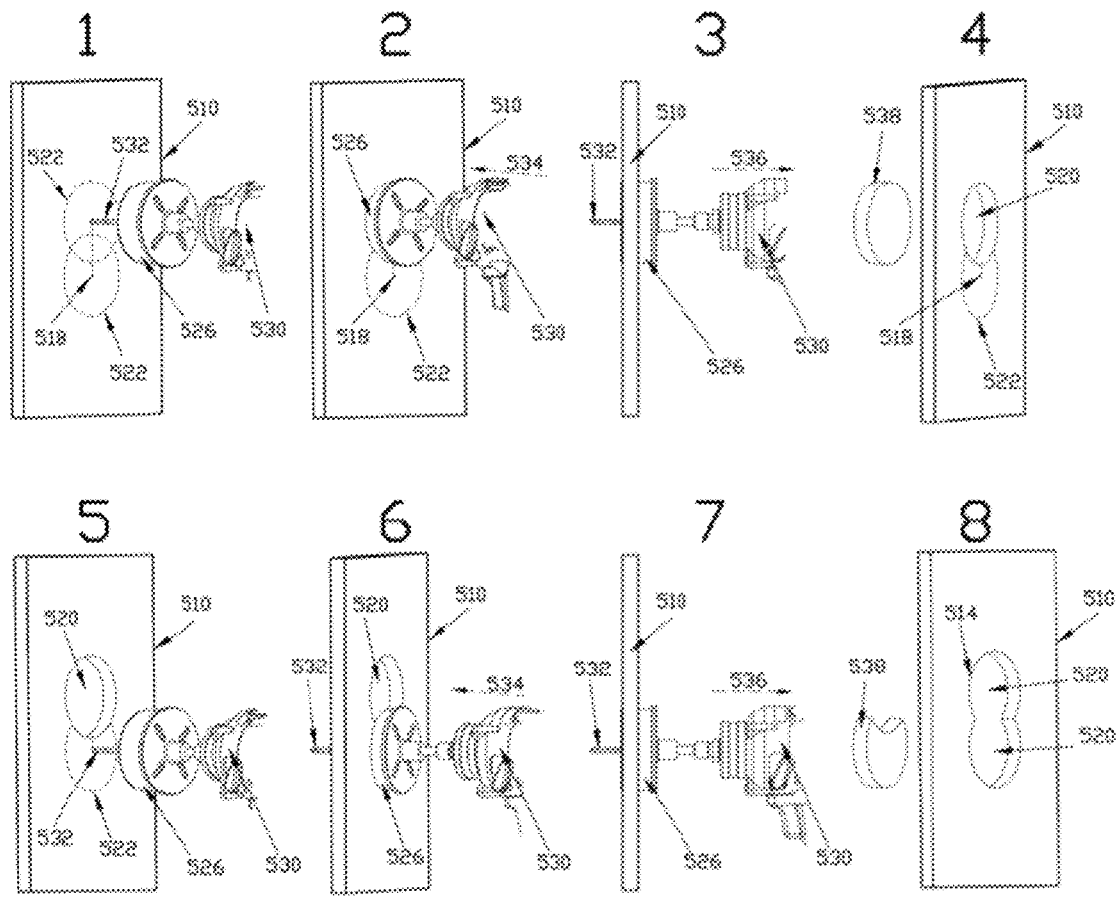
FIG. 7 shows a simple sequence of steps to illustrate the creation of a curvilinear wall opening (514) to install the frame (10) of the one-gang retrofit (old work) electrical box assembly device for low voltage applications of the present invention, using a standard dimensioned circular saw (526) driven by a battery powered drill (530) and guided by the pair of wall marks (518); parts, elements and actions are indicated.

FIG. 7 illustrates a sequence of drilling operations to create the curvilinear wall opening (514), based on the example of FIG. 5, after the pair of wall marks (518) are generated having the frame (10) at the positioning height (432) and leveled in vertical direction. The drilling operations are done using the battery powered drill (530) equipped with the circular saw (526) of diameter dimension (D), with a drill bit guide (532) centered on the pair of wall marks (518); as a result, the two intersecting circular wall holes (520) conform the vertically orientated curvilinear wall opening (514) to install the frame (10). A pair of forward movements (534) and a pair of backward movements (536) of the battery powered drill (530) and a pair of wall leftover (538) are also indicated in this figure.

In a preferred embodiment of the present invention, the one-gang retrofit (old work) electrical box assembly device for low voltage applications is outlined with respect to the imaginary and referential rectangular ring shape envelope (34) (see FIG. 1 and FIG. 4), which is not part of the device but establishes important design boundaries for the invention and is being defined by two concentric rectangular forms, the external rectangle (36) and the internal rectangle (38). The external rectangle (36) has the dimensions of a back-facing delimited area by the interior edge (314) of the smallest cover plate (312) traded in this industry for the standard one-gang rectangular electrical boxes which impose maximum external limits to insure the one-gang retrofit (old work) electrical box assembly device of the present invention does not collide with a vertical or horizontal studs (512) behind the wall (510), near or just in the borders of the curvilinear wall opening (514) where it has to be installed. Likewise, the internal rectangle (38) exhibits dimensions of the internal rectangular open-side cross-section area of the standard one-gang rectangular electrical boxes traded in this industry which impose the minimum internal limits, ensuring compliance with dimensional regulatory constraints while maximizing interior space. The external rectangle (36) and the internal rectangle (38) collectively feature the mayor symmetry line (40) and the minor symmetry line (42), which are coincident with the symmetry lines of the one-gang retrofit (old work) electrical box assembly device for low voltage applications of the present invention.

Building upon the details of this embodiment (See FIGS. 1, 2, 3 and 4), the one-gang retrofit (old work) electrical box assembly device for low voltage applications itself comprises the frame (10) as a first part, formed by the curvilinear closed thin-walled section element (12) adapted to fit into the curvilinear wall opening (514) and is characterized by the maximum depth dimension (46) smaller than the smallest standard wall thickness dimension (516).

In further details, the curvilinear closed thin-walled section element (12) has the pair of large arc thin-walled segment sub-elements (14) facing each other by their open sides (details in FIGS. 1 and 4), defined with a slightly conical shape with an inward tapered profile addressing requirements for molding or stamping production process, having the diameter dimension (D) that is slightly smaller than an interior edge width dimension (316) of the smallest cover plate (312) traded in this industry for the standard one-gang rectangular electrical boxes, and provided with the pair of centers (20) that exhibits an alignment along the mayor symmetry line (40) featuring the separation distance dimension (22) greater than the radius dimension (R) but smaller than the diameter dimension (D), and with a condition in which the separation distance dimension (22) added to the diameter dimension (D) is slightly smaller than an interior edge height dimension (318) of the smallest cover plate (312) traded in this industry for the standard one-gang rectangular electrical boxes which is basic to keep the wall marks (518) of the pair of centers (20) visible during the creation of the curvilinear wall opening (514).

Continuing with the curvilinear closed thin-walled section element (12), it includes the pair of small arc thin-walled segment sub-elements (24), engineered to provide a smooth connection between the pair of large arc thin-walled segment sub-elements (14), designed with the same slightly conical shape but with an outward tapered profile.

Moreover, the frame (10) as the first part further comprises the pair of front fixed jaws elements (26) protruding the front fixed jaw thickness (28) from the front edge (44) of the curvilinear closed thin-walled section element (12) and projecting perpendicular outward from its inner side, suitable to hold the clamping force that secure the frame (10) to the wall (510) and within the curvilinear wall opening (514) (See FIGS. 1, 2, 3 and 4).

Advancing the details of this embodiment, the pair of the low voltage electrical device mounting interface sub-elements (30) are included within the frame (10) separated at a standard distance capable of provide support for the low voltage electrical device (310) suitable to be installed within the electrical box assembly, arranged to present a central alignment with the mayor symmetry line (40) and mirroring each other over the minor symmetry line (42). The design ensures the pair of electrical device mounting interface elements (30) meet operational requirements for a secure positioning of the low voltage electrical device (310).

In addition, the frame (10) is configured with a two pairs of the wall attachment features sub-elements (32) that are provided as adjacent to the pairs of low voltage electrical device mounting interface elements (30), and designed to house elements of the wall attachment means as a second part of the one-gang retrofit (old work) electrical box assembly device for low voltage applications. Each wall attachment features sub-elements (32) includes the guide fins sub-element (48) characterized by a quadrilateral flat form, protruding from the back side plane (52) of the frame (10) with the guide fins length dimension (50) of at least the maximum depth dimension (46), collectively serving as a guides for elements of the second part and ensuring the frame (10) fulfills specific structural and mechanical roles (e.g., tension relief, alignment facilitation, and force distribution).

Continuing with the present disclosure, the one-gang retrofit (old work) electrical box assembly device for low voltage applications further include at least the pair of the first wall attachment means (110) and/or at least the pair of the second wall attachment means (210) that can be seen as two versions of a second part, each element of a pair configured to work diagonally opposed to secure the frame (10) to the wall (510) and within the curvilinear wall opening (514) (See FIGS. 2, 3 and 4).

In a particular configuration of the present invention (See FIG. 2), the first wall attachment means (110) as the second part, is provided with the first insertable structural elements (112) having the circular through-cavity (114) arranged to house (from the front side of the frame (10)) only a cylindrical threaded body (122) of the screw (120) as the fastening element, wherein the screw (120) passing through the wall attachment features sub-elements (32) is capable of being screwed within the circular slot (118) of the movable circular-slotted jaws elements (116) (located in the back side of the frame (10)) to drive the movable circular-slotted jaws elements (116) toward the front fixed jaw elements (26) to exert a clamping force against the wall (510) while sandwiching the wall (510) between them to secure the frame (10) to the wall (510) and within the curvilinear wall opening (514) and acting as the locking mechanism to hold the mentioned clamping force.

Turning to a further embodiment of the present invention (See FIG. 3), the second wall attachment means (210) as the second part, comprises the second insertable structural elements (212) exhibiting the L-shaped through-cavity (214) including the pawl-lock sub-element (222), wherein the L-shaped through-cavity (214) and the pawl-lock sub-element (222) are biased to receive and engage with a series of the ratchet teeth sub-elements (224) formed along a surface of the flexible L-shaped ratchet strap element (220) which is previously engaged with the movable L-shaped slotted jaws element (216) by the L-shaped slot (218) and capable to drive the movable L-shaped slotted jaws element (216) toward the front fixed jaw elements (26) to exert a clamping force against the wall (510) while sandwiching the wall (510) between them to secure the frame (10) to the wall (510) within the curvilinear wall opening (514) acting as the locking mechanism to hold the said clamping force.

Continuing with details of this embodiment (See FIG. 3), in operation, when the flexible L-shaped ratchet strap element (220) is engaged with the movable L-shaped slotted jaws element (216) and introduced (from the back side of the frame (10) and through the wall attachment featuressub-elements (32)) into the L-shaped through-cavity (214) of the second insertable structural element (212), the pawl-lock sub-element (222) is urged into contact with one of the ratchet teeth sub-elements (224), thereby preventing withdrawal of the flexible L-shaped ratchet strap element (220) in reverse direction. This configuration creates a unidirectional locking mechanism to secure the flexible L-shaped ratchet strap element (220) under normal operating conditions, while still allowing incremental adjustment as the flexible L-shaped ratchet strap element (220) is further advanced through the L-shaped through-cavity (214).

From another operational perspective, the pawl-lock sub-element (222) is configured to be disengaged from the ratchet teeth sub-elements (224) of the flexible L-shaped ratchet strap element (220). The installer can pivot the pawl-lock sub-element (222) away from the ratchet teeth sub-elements (224) of the flexible L-shaped ratchet strap element (220) using an small flat tip screwdriver or similar tool inserted within a decoupling channel (226), this action permits intentional retraction or removal of the flexible L-shaped ratchet strap element (220), while maintaining a secure lock under normal operating conditions.

It should further be noted that in all embodiments of the present invention, all elements of the frame (10) and the first wall attachment means (110) and second wall attachment means (210) are engineered to not protrude from the imaginary and referential rectangular ring shape envelope (34) (See FIGS. 1 and 4) maintaining the one-gang retrofit (old work) electrical box assembly device for low voltage applications under valid predefined conditions-such as it does not collide with the vertical or horizontal studs (512) behind the walls (510), near or just in the borders of the curvilinear wall opening (514) where it has to be installed and in compliance with internal and external dimensional regulatory constraints, ensuring maximum interior dimensions and operational consistency.

In addition, all parts of the embodiments can be formed from a rigid or semi-rigid material (e.g., metal, composite, or polymer and combination of them but not limited to them) that supports the operational loads or environmental conditions under which the one-gang retrofit (old work) electrical box assembly device for low voltage applications may operate.

In a further refinement of the embodiments of the present invention, the one-gang retrofit (old work) electrical box assembly device for low voltage applications is configured to optionally incorporate forms of the first wall attachment means (110) and/or the second wall attachment means (210) described above and always presented in pairs, where each pair is always presented as a diagonally opposed working couple. This optional arrangement ensures that either type of locking mechanism can be used along or in tandem, providing a balanced and secured locking configuration while accommodating varying installation requirements for the first time in this field of invention.

In a particular implementation of the present invention, the one-gang retrofit (old work) electrical box assembly device for low voltage applications, the maximum depth dimension (46) is not greater than 0.500 inches, the pair of large arc thin-walled segment elements have the diameter dimension (D) of about 2.540 inches with the pair of centers (20) at the separation distance dimension (22) of about 1.660 inches, the front fixed jaw thickness (28) is no more than 0.047 inches, the guide fins length dimension is not greater than 0.900 inches. As a result the maximum length limit from the back side of the front fixed jaws elements (26) to the end of the guide fins sub-elements (48) is 1.400 inches, which provide the one-gang retrofit (old work) electrical box assembly device for low voltage applications of the present with the ability to be installed in perimeter walls were the space behind the walls is reduced to a minimum of 0.900 inches approximately.

In certain embodiments of the present invention, the first insertable structural elements (112) and the second insertable structural elements (212) are presented as integrally embedded within the correspondent wall attachment features sub-elements (32) of the frame (10), rather than being inserted as separated component. In this arrangement the first insertable structural elements (112) and the second insertable structural elements (212) are formed or molded within the frame (10), ensuring a seamless integration that enhances structural integrity.

In a further aspect of the embodiments of the present invention, the manufacturing process of the one-gang retrofit (old work) electrical box assembly device for low voltage applications, whether through plastic molding or metal stamping, generates some specific residues such as plastic runners or metal burrs that can be intentionally retained on the main functional parts to offer structural support. In this case, those residues are used to embed the alignment-positioning-leveling-marking tool (400) within the frame (10) (See FIGS. 5 and 6).

As an additional feature of the embodiments of the present invention, the alignment-positioning-leveling-marking tool (400) is conceived as an integral part of the frame (10) of the one-gang retrofit (old work) electrical box assembly device for low voltage applications (See FIGS. 5 and 6) and as such it is formed from the same rigid or semi-rigid material (e.g., metal, composite, or polymer but not limited to them). The alignment-positioning-leveling-marking tool (400) is configured to provide the alignment axes, the positioning height adjustment, the leveling guides, and the marking aids to generate the pair of wall marks (518) in the wall (510) to guide a wall drilling operation to create the two intersecting circular wall holes (520) with the vertical or horizontal orientated projected boundaries (522 or 524) conforming the curvilinear wall opening (514) to install the one-gang retrofit (old work) electrical box assembly device for low voltage applications. Eventually the alignment-positioning-leveling-marking tool (400) needs to be removed from the frame (10) after the curvilinear wall opening (514) is created.

Further expanding details of this additional feature, the ring centered cross-shaped alignment structure (410) forms the first major part of the alignment-positioning-leveling-marking tool (400) and possesses all its elements defined in alignment and coincidence with the back side plane (52) of the frame (10) providing a solid alignment component for leveling and marking purposes.

As elements of its structure, the ring centered cross-shaped alignment structure includes:

5. The pair of long arms elements (412), which are adapted to be associated with the vertical direction, and exhibiting an opposition to each other, converging at the central ring element (414), and in alignment and coincidence with the mayor symmetry line (40) of the frame (10) and are joined to the correspondent low voltage electrical device mounting interface element (30) and associated with the vertical direction.
6. The marking aids sub-elements (416) within the pair of long arms elements (412), featuring a center punch conical form, an apexes (436) perpendicular to the back side plane (52), protruding in the same direction and size as the guide fins sub-elements (48) and concentric with the pair of centers (20) of the pair of large arc thin-walled segment sub-elements (14). The marking aids sub-elements (416) are configured to serve as a tool to generate the pair of wall marks (518) on the wall (510) by a pressing action on them.
7. The pair of short arms elements (418), which have opposition to each other, at 90 degrees angle respect to the two long arms elements (412), converging to the central ring element (414), aligned and coincident with the minor symmetry line (42) of the frame (10), and associated with the horizontal direction.
8. The central ring element (414), configured to define the reference point of the positioning height (432) and to support the adjustable plumb body (422), as a second part of the alignment-positioning-leveling-marking tool.

As the second part of this structure, the adjustable plumb body (422) constitutes the other main portion of the alignment-positioning-leveling-marking tool (400), configured to provide a leveling guide and positioning height definition and includes:

4. The adjustable cord element (424), adapted to freely displace through the central ring element (414) with the capacity to become a leveling and measuring reference when is completely stretched.
5. The fixed weight element (426), configured to displace and stretch the adjustable cord element (424) by the action of gravitational force towards the reference level (420) while being attached to one end of the adjustable cord element (424) at the back side of the central ring element (414).
6. The movable cord locker element (428), arranged to grip the adjustable cord element (424) at the opposite end of where the fixed weight element (426) is attached, being located at the front side of the central ring element (414) while adjusting the displacement length dimension (430) within the adjustable cord element (424) defining the positioning height (432).

Collectively in operation, to generate the two wall marks (518) that guide the drilling operation to create the two intersecting circular wall holes (520) with either the vertical or horizontal orientated projected boundaries (522 or,524) that conform the curvilinear wall opening (514) (See FIG. 5 and FIG. 6), the movable cord locker element (428) has to grip the adjustable cord element (424), at a distance from the fixed weight element (426) equal to the desired positioning height (432) respect to the defined reference level (420); with the positioning height (432) adjusted within the adjustable cord element (424), the frame (10) has to be positioned at a height from the defined reference level (420) that allows the adjustable cord element (424) to get completely stretched by the gravitational force acting on the fixed weight element (426) while keeping the fixed weight element (426) freely hanging with near-zero clearance above the reference level (420). At this point, the frame (10) is at the desired positioning height (432) and the adjustable cord element (424) can act as a leveling reference to level the frame (10) in either vertical or horizontal direction.

With the above conditions achieved, to level the frame (10) in the vertical direction, the frame (10) has to be rotated till the vertical misalignment angle (V.M.A), between the pair of long arms elements (412) and the stretched adjustable cord element (424), is equal to zero while keeping the back side plane (52) of the frame (10) near and parallel to the wall (510). On the other hand, to level the frame (10) in horizontal direction, the frame (10) has to be rotated till the horizontal misalignment angle (H.M.A), between the pair of short arms (418) and the stretched adjustable cord element (424), is equal to zero while keeping the back side plane (52) of the frame (10) near and parallel to the wall (510).

Only after having the frame (10) leveled in either vertically or horizontally direction at the desired positioning height (432), and all the guide fins sub-elements (48) touching the wall (510), the two wall marks (518) can be created by pressing the two marking aids sub-elements (416) against the wall (510).

What is claimed is:

1. A one-gang retrofit (old work) electrical box assembly device for low voltage application, a one-gang retrofit (old work) electrical box assembly comprising:

a frame, the frame formed by a curvilinear closed thin-walled section element adapted to fit into a curvilinear wall opening, characterized by a maximum depth dimension smaller than a smallest wall thickness dimension, and including a pair of large arc thin-walled segment sub-elements arranged to face each other by their open sides and defined with a slightly conical shape with an inward tapered profile, the pair of large arc thin-walled segment sub-elements having a diameter dimension slightly smaller than an interior edge width dimension of a smallest cover plate traded in this industry for a standard one-gang rectangular electrical boxes, a pair of centers exhibiting an alignment along a mayor symmetry line of the frame and featuring a separation distance dimension greater than a radius dimension and smaller than the diameter dimension of the pair of large arc thin-walled segment sub-elements, so as the separation distance dimension added to the diameter dimension is slightly smaller than a interior edge height dimension of the smallest cover plate traded in this industry for the standard one-gang rectangular electrical boxes, wherein the curvilinear closed thin-walled section element includes a pair of small arc thin-walled segment sub-elements engineered to smoothly connect the pair of large arc thin-walled segment sub-elements being designed with the same slightly conical shape but with an outward tapered profile, the frame as a first part further comprising a pair of front fixed jaws elements, protruding a front fixed jaw thickness from a front edge of the curvilinear closed thin-walled section element and projecting perpendicular outward from its inner side, suitable to hold a clamping force that secure the frame to a wall and within the curvilinear wall opening, and a pair of low voltage electrical device mounting interface sub-elements separated at a standard distance capable of provide support for a low voltage electrical devices suitable to be installed within the one-gang retrofit (old work) electrical box assembly device for low voltage application and arranged to present a central alignment with the mayor symmetry line of the frame and mirroring each other over a minor symmetry line of the frame, the frame as the first part is configured with two pairs of wall attachment features sub-elements provided as adjacent to the pair of low voltage electrical device mounting interface elements and design to house elements of a wall attachment means as a second part, the wall attachment features sub-elements including a guide fins sub-element characterized by a quadrilateral flat form, protruding from a back side plane of the frame, with a guide fins length dimension of at least the maximum depth dimension of the curvilinear closed thin-walled section element, and set up to serve as a guide for an element of the wall attachment means; the one-gang retrofit (old work) electrical box assembly device for low voltage applications further includes at least one pair of the wall attachment means where each element of the pair is configured to work diagonally opposed to each other to secure the frame to the wall within the curvilinear wall opening, provided with an insertable structural element adapted to fit into the wall attachment features sub-elements, exhibiting a through-cavity arranged to house a fastening element, the fastening element capable of engage a movable slotted jaws element by its slot and driving it toward the front fixed jaws elements guided by the guide fins sub-elements, the movable slotted jaw element design to exert the clamping force against the front fixed jaws elements sandwiching the wall between them to secure the frame to the wall within the curvilinear wall opening; wherein all elements of the frame and the wall attachment means are engineered to not protrude from an imaginary and referential rectangular ring shape envelope that is not part of the device but is defined for a design purposes of impose a maximum exterior limits and a minimum interior limits to the one-gang retrofit (old work) electrical box assembly device for low voltage applications, to ensure it does not collide with a vertical or horizontal studs behind the wall near or just in a borders of the curvilinear wall opening where it has to be installed while achieving a maximum interior dimensions with an operational consistency and staying in compliance with an interior and an exterior dimensional regulatory constraints; the imaginary and referential rectangular ring shape envelope is defined by a pair of concentric rectangular forms, an external rectangle and an internal rectangle; the external rectangle having a dimensions of a back-facing delimited area by the interior edges of the smallest cover plate traded in this industry for the standard one-gang rectangular electrical boxes which impose the maximum exterior limits to the one-gang retrofit (old work) electrical box assembly device for low voltage applications, ensuring it does not collide with the vertical or horizontal studs behind the wall, near or just in the borders of the curvilinear wall opening where it has to be installed; the internal rectangle exhibiting a dimensions of a internal open-side cross-section area of the standard one-gang rectangular electrical boxes traded in this industry which impose the minimum interior limits to the one-gang retrofit (old work) electrical box assembly device for low voltage applications, ensuring it complies with the interior dimensional regulatory constraints while achieving the maximum interior dimensions; both concentric rectangles collectively feature the mayor symmetry line and the minor symmetry line, the mayor symmetry line is shared with the imaginary and referential rectangular ring shape envelope and is coincident with the mayor symmetry line of the frame of the one-gang retrofit (old work) electrical box assembly device for low voltage applications of the present invention and is associated with a vertical orientation of it, the minor symmetry line is shared with the imaginary and referential rectangular ring shape envelope and is coincident with the minor symmetry line of the frame of the one-gang retrofit (old work) electrical box assembly device for low voltage applications of the present invention and is associated with a horizontal orientation of it; wherein all elements of the frame and the wall attachment means can be formed from a rigid or semi-rigid material that supports an operational loads or an environmental conditions under which the one-gang retrofit (old work) electrical box assembly device for low voltage applications may operate, whereby the frame and the wall attachment means cooperate to carry out their respective functions in accordance with the limits of the defined imaginary and referential rectangular ring shape envelope.

2. The one-gang retrofit (old work) electrical box assembly device for low voltage applications from claim 1, wherein the wall attachment means as the second part is provided with the insertable structural element exhibiting a circular through-cavity sized to house only a cylindrical threaded body of a screw as the fastening element, capable of engage with a movable circular-slotted jaw element which feature a circular slot where the screw is screwed to drive the movable circular-slotted jaws element toward the front fixed jaws elements to exert the clamping force against the wall, while sandwiching the wall between them, to secure the frame to the wall and within the curvilinear wall opening while acting as the locking mechanism to hold the said clamping force.

3. The one-gang retrofit (old work) electrical box assembly device for low voltage applications from claim 1, wherein the wall attachment means as the second part is provided with the insertable structural element exhibiting an L-shaped through-cavity including a pawl-lock sub-element having a decoupling channel, wherein the L-shaped through-cavity and the pawl-lock sub-element are biased to receive and engage a series of a ratchet teeth sub-elements formed along a surface of a flexible L-shaped ratchet strap element as the fastening element which is capable of engage with the movable L-shaped slotted jaws elements through a L-shaped slotted and drive the movable L-shaped slotted jaws elements toward the front fixed jaw elements to exert the clamping force against the wall while sandwiching the wall between them, to secure the frame to the wall and within the curvilinear wall opening while acting as the locking mechanism to hold the said clamping force, and wherein all L-shaped cavities and L-shaped bodies have a uniform L-shape to ensuring matching engagement.

4. The one-gang retrofit (old work) electrical box assembly device for low voltage applications from claim 1, wherein the wall attachment means as the second part is provided with the insertable structural element exhibiting a polygonal through-cavity including the pawl-lock sub-element, wherein the polygonal through-cavity and the pawl-lock sub-element are biased to receive and engage a series of the ratchet teeth sub-elements formed along the surface of a flexible polygonal-shaped ratchet strap element as the fastening element which is capable of engage with a movable polygonal-shaped slotted jaws elements through a polygonal-shaped slotted and drive the movable polygonal-shaped slotted jaws elements toward the front fixed jaw elements to exert the clamping force against the wall while sandwiching the wall between them, to secure the frame to the wall and within the curvilinear wall opening while acting as the locking mechanism to hold the said clamping force, and wherein all polygonal shaped cavities and polygonal shaped bodies have a uniform polygonal shape to ensuring matching engagement.

5. The one-gang retrofit (old work) electrical box assembly device for low voltage applications from claim 1, wherein the curvilinear closed thin-walled section element is provided with the maximum depth dimension smaller than 0.500 inches, the pair of large arc thin-walled segment elements have the diameter dimension of about 2.540 inches with the centers at the separation distance of about 1.660 inches, the front fixed jaw thickness have no more than 0.047 inches, the guide fins length dimension is not greater than 0.900 inches.

6. The one-gang retrofit (old work) electrical box assembly device for low voltage applications from claim 1, wherein the insertable structural elements of the wall attachment means are integrally embedded within the wall attachment features sub-elements of the frame, rather than being inserted as separated component within the wall attachment features sub-elements.

7. The one-gang retrofit (old work) electrical box assembly device for low voltage application from claim 1, comprising within its frame an alignment-positioning-leveling-marking tool configured to provide an alignment axes, a positioning height adjustment, a leveling guides and a pair of marking aids to generate a pair of wall marks at a positioning height with a proper level and a proper orientation on a given vertical surface to guide the creation of a pair of intersecting circular wall holes that conform the wall opening to install the one-gang retrofit (old work) electrical box assembly device for low voltage application; the alignment-positioning-leveling-marking tool is conceived as an integral part of the frame for installation purposes and eventually need to be removed from the frame after the curvilinear wall opening is created; wherein the alignment-positioning-leveling-marking tool comprises at least a ring centered cross-shaped alignment structure as a first part defined in alignment and coincidence with the back side plane of the frame of the one-gang retrofit (old work) electrical box assembly device for low voltage applications, and includes a pair of long arms elements, exhibiting opposition to each other, converging at a central ring element, aligned along the mayor symmetry line of the frame which is associated with the vertical orientation of the frame, the pair of long arms elements further including the pair of marking aids sub-elements featuring a defined distance from the central ring element, concentric with the pair of centers of the pairs of large arc thin-walled segment elements of the frame, with a center punch conical forms with an apexes protruding in the same direction and size as the guide fin sub-elements of the one-gang retrofit (old work) electrical box assembly device for low voltage applications, the pair of marking aid sub-elements configured to serve as a tool to generate the pair of wall marks on the given surface, wherein the ring centered cross-shaped alignment structure as first part further includes a pair of short arms elements having opposition to each other, perpendicular respect to the pair of long arms elements, converging to the central ring element, aligned along the minor symmetry line of the frame and associated with the horizontal orientation, the pair of long arms elements and the pair of short arms element collectively providing a solid alignment component for positioning, leveling and marking purposes for the alignment-positioning-leveling-marking tool, wherein the ring centered cross-shaped alignment structure as the first part additionally includes the central ring element configured to define a reference point for the positioning height and to support an adjustable plumb body as a second part of the alignment-positioning-leveling-marking tool, where the adjustable plumb body as second part is configured to provide the leveling guide and the positioning height definition, wherein the adjustable plumb body has an adjustable cord element adapted to freely displace through the central ring element, a fixed weight element configured to be attached to one end of the adjustable cord element and to displace and stretch it by the gravitational force acting that makes it plumb towards a reference level for the positioning height measurement, and a movable cord locker element arranged to grip the adjustable cord element at its opposite end while adjusting a displacement length dimension on it, defining the positioning height, wherein collectively in operation, the adjustable cord element completely stretched by the gravitational force acting on the fixed weight element towards the reference level, the fixed weight element freely hanging with near-zero clearance above the reference level and the movable cord locker element limiting the adjustable cord element displacement at the defined positioning height and serving as the leveling guide, so as the ring centered cross-shaped alignment structure elements being parallel to the vertical surface with either the pair of long arms elements or the pair of short arms elements aligned with the adjustable plumb body ensuring the proper leveling either in the vertical or the horizontal orientation respectively, thereby enabling the alignment-positioning-leveling-marking tool in carrying out its functions of providing the alignment axes, the positioning height adjustment, the leveling guides and under all above conditions enabling the pair of marking aids to generate the pair of wall marks by a pressing action on them.

* * * * *